३,४१८,१६३
MAGNETORESISTIVE MAGNETOSTRICTION MONITORING
Paul E. Oberg, Minneapolis, and Charles H. Tolman, Bloomington, Minn., assignors to Sperry Rand Corporation, New York, N.Y., a corporation of Delaware
Filed Dec. 27, 1965, Ser. No. 516,251
8 Claims. (Cl. 117—201)

The present invention relates to a method for monitoring the magnetostriction of thin magnetic films during deposition.

A material which, when subjected to a magnetic field, undergoes a change in its dimensional characteristics or which, when subjected to a stress, undergoes a change in its magnetic characteristics is said to be "magnetoelastic." These magnetoelastic effects are known as "magnetostriction." The fractional change in the element's dimension due to magnetostriction varies with the intensity of the applied magnetic field or stress.

The magnetostrictive characteristics of a deposited-layer element may dictate its usefulness or limitations in a particular application. As an example, a strain gauge may utilize this characteristic for the measurement of applied stresses; the to-be-determined stress produces a known signal-output, stress-input relationship. When being used as a strain gauge, magnetostriction is a desirable characteristic enabling the determination of unknown applied stresses. However, in other uses, as for example, in magnetizable memory elements of the thin ferromagnetic film type, it is desirable that such elements be substantially nonmagnetostrictive or, in other words, have zero magnetostriction. This is so since it is desirable to prevent the stresses which are applied to the film-bearing substrate by mechanical or thermal means from adversely affecting the magnetic properties of the film.

In copending application Ser. No. 332,220 filed Dec. 20, 1963, now Patent No. 3,336,154, and assigned to the assignee of the instant application, a thin film memory element of ferromagnetic material is vapor deposited upon a suitable substrate while cyclical tensile and compressive stresses are applied to the film being formed and an A.C. drive field is applied parallel to the plane of the film.

The A.C. field not only switches the film but also defines an easy axis of magnetization for the film.

The variation in the magnetic field of the film due to the cyclic stresses is detected and analyzed as to its iron-rich or nickel-rich properties with suitable compensatory adjustments being made during the deposition process to achieve a film of zero magnetostriction. Stress-modulated output signals were inductively sensed by a multi-turn pickup coil located directly above the film under stress.

The present invention employs the same or similar mechanical means of applying a stress to the substrate upon which the film is being deposited, but the inductive sensing method is replaced by a magnetoresistive sensing method. Thus, the property of magnetoresistance is used to detect the property of magnetostriction in thin magnetic films.

One of the major problems concerning prior art devices for sensing zero magnetostriction is the fact that the multi-turn pickup coil for inductively sensing stress-modulated output signals must be very critically positioned. It must be so precisely aligned that it will sense only the stress-modulated output signals and not the A.C. field applied for switching the film. Further, this multi-turn pickup coil must be used in a vacuum deposition chamber where the temperatures are extreme thus causing insulation failure. Finally, the present invention is much less complicated and cumbersome than the multi-turn pickup coil.

The phenomenon of magnetoresistance in magnetic elements displaying single domain properties has been described in detail in copending applications 361,364, filed Apr. 21, 1964, 375,482, filed June 16, 1964, now Patent No. 3,353,086, and 466,715 filed June 24, 1965, all of which are assigned to the assignee of the instant application. In general, however, this phenomenon can be described as a rotation of the magnetization which causes a change in the electrical resistance of the material. The application of a magnetic field or the application of a stress to a magnetostrictive film element will, in general, cause a rotation of the magnetization. The resistance of the film element can be express as (1) $$R = (R_1 - R_2) \cos^2 \Psi + R_2$$

where $R_1$ and $R_2$ are constants of the magnetic material ($R_1 > R_2$) and $\Psi$ is the angle between the magnetization and the direction of the resistance measurement.

Figure 1:
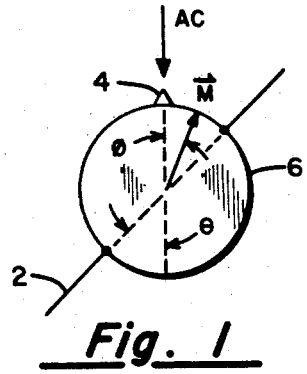
FIG. 1 is a diagram showing the relationship between the resistance measurement sense line, the easy axis and the rotating magnetic vector.

With reference to FIG. 1, if $\theta$ is the angle between the rest state of the magnetization (easy axis) and the direction of resistance measurement, and if $\phi$ is the angle of rotation of the magnetization away from the easy axis due to a stress applied to the film, then the change in resistance, $dR$, due to the rotation is (2) $$dR = (dR)_0 [\cos^2(\theta - \phi) - \cos^2 \theta]$$

where $(dR)_0 = R_1 - R_2$ and is the maximum resistance change. Thus, if a stress is applied to the magnetostrictive film, the magetization in general, rotates away from the unstressed easy axis and an output is observed when the magnetization of the film is switched by an applied field.

When attempting to deposit near zero magnetostrictive films, the rotation, $\phi$, of the magnetization due to the strain will be very small. Thus, the maximum output signal must be obtained with a very small strain or rotation of the magnetization. By placing the resistance measurement sense line 2 at $\theta = 45°$ with respect to the unstrained easy direction 4 as shown in FIG. 1, the maximum variation in the resistance change of film 6 will be observed for small values of $\phi$. This may be demonstrated by taking the second derivative of Equation 1 with respect to $\phi$ where $\Psi = \theta - \phi$.

Figure 2:
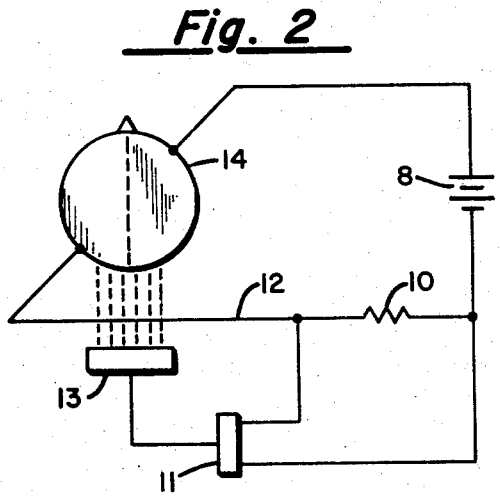
FIG. 2 shows a general arrangement for sensing the magnetostriction of thin films by employing the magnetoresistive effect.

FIG. 2 shows a general arrangement for sensing the magnetostriction of thin films employing the magnetoresistive effect. Battery 8 and external resistance 10 are connected in series by resistance measurement sense line 12 to film 14. A change in the voltage variable corresponding to the film resistance change can be observed when the magnetization of the film 14 is reversed by sensing directly across the film. The voltage drop, E, across the film 14 is (3) $$E = IR$$

where I is the current flowing in the circuit and R is the resistance of the film. The change in the voltage drop, $dE$, due to a resistance change that results from an applied stress and/or applied magnetic field is (4) $$dE = E\left(\frac{dI}{I} + \frac{dR}{R}\right)$$

where $dI$ and $dR$ are the changes in the current and resistance, respectively. If a regulated power supply replaces the battery 8 so that the current change is zero ($dI=0$), then the voltage drop change is (5) $$dE = E\left(\frac{dR}{R}\right)$$

or (6) $$dE = I(dR)$$

The term $dR/R$ is dependent upon the applied stress and the magnetostriction of the film, but it is independent of film thickness. The maximum value of $dR/R$ depends upon the temperature and alloy composition of the material. As the deposition proceeds, the film thickness increases and, therefore, the film resistance decreases. See commonly assigned copending application 395,137, filed Sept. 9, 1964 now Patent No. 3,372,387. Since I is kept constant, Equation 6 states that the voltage change $dE$ will decrease across the film as the film thickness increases for the same value of $dR/R$. Thus, the sensitivity of measurement across the film decreases as the deposition proceeds. It is obvious, however, that for optimum results there should be an increasing sensitivity of measurement as the deposition proceeds. This can be accomplished by detecting either of two electrical variables of the circuit. First, by sensing the voltage change, $dE$, across resistance 10 in FIG. 2 provided that a non-regulated power supply is used and, therefore, current flow changes. Differentiator 11 in FIG. 2 produces a maximum rate of change of the voltage which is used to control the deposition process as described later. Secondly, this can be achieved with the circuit shown in FIG. 3.

Figure 3:
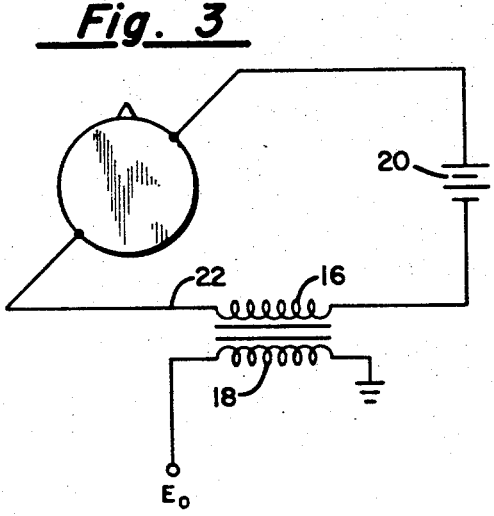
FIG. 3 shows another embodiment of the device shown in FIG. 2.

FIG. 3 differs from FIG. 2 in that the external resistor 10 of FIG. 2 has been removed and replaced with a low resistance-low inductive pulse transformer 16 which can be used to sense a current change, $dI$, on output winding 18. Battery 8 of FIG. 2 has been replaced with a low voltage battery or power supply 20. The current, I, flowing in the resistance measurement sense line 22 is then (7) $$I = \frac{E}{R}$$

where E is the supply voltage and R is the resistance of the film. The resistance of the film is much greater than the resistance of the pulse transformer. The current change that results from a resistance change is (8) $$dI = \left(\frac{dE}{E} - \frac{dR}{R}\right)$$

but since $dE=0$, Equation 8 becomes (9) $$dI = -I\frac{(dR)}{R}$$

(10) $$dI = -\frac{E}{R}\left(\frac{dR}{R}\right)$$

Since E is constant, Equation 10 states that the current change $dI$ increases as the deposition proceeds (resistance decreases) for a constant value of $dR/R$. This method of sensing provides an increasing sensitivity with increasing film thickness.

If the film is being deposited with zero magnetostriction, pulse transformer 16 produces no output signal. This occurs because $dI$, although gradually increasing, increases so slowly that the change is ineffective when detected over the several seconds of time required for the deposition to take place.

Figure 4:
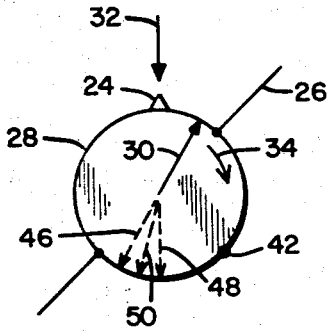
FIG. 4 illustrates a specific example of the rotation of the thin film magnetic vector.

Consider FIG. 4 which shows the easy axis 24 at an angle of 45° to the resistance measurement sense line 26. The resistance of the film 28 will be a median value under these circumstances. Assume that the film 28 is being stressed at a slow rate by a device not shown. If the film 28 is being deposited with zero magnetostriction, the stresses on the film 28 do not cause the easy axis magnetic vector 24 to rotate from its position at 45° to sense line 26 and therefore the resistance of the film 28 does not change due to stress. The film resistance will change gradually due to the deposition process since the thicker the film becomes, the less its resistance. This causes the current, $dI$, to increase gradually but, as stated above, the change is ineffective when detected over the deposition time interval.

Figure 5:
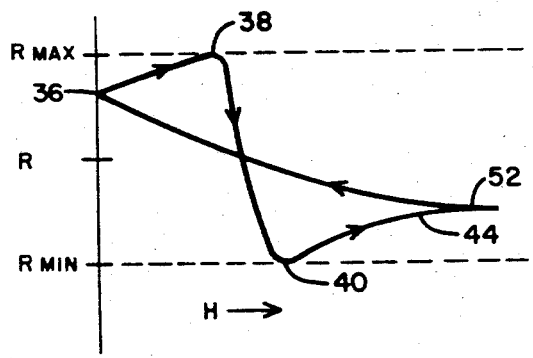
FIG. 5 is a graph of film resistance versus the applied A.C. field.
Figure 6:
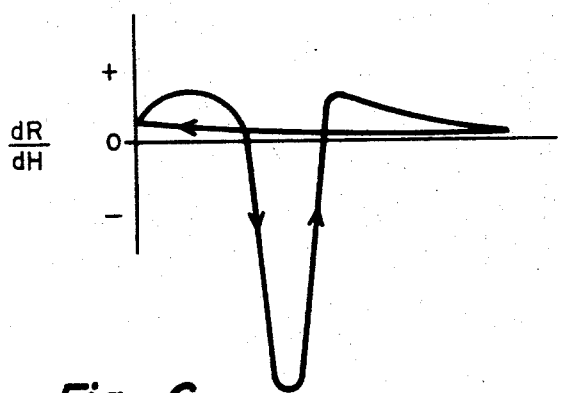
FIG. 6 is the resultant graph when the curve of FIG. 5 is differentiated.

Assume, however, that the film is being deposited with a non-zero magnetostriction. Assume also that the stress applied to film 28 causes the magnetic vector to rotate from position 24 to position 30. Externally applied A.C. field 32 now causes vector 30 to rotate in the direction shown by arrow 34. The resultant graph of film resistance versus the applied A.C. field, H, is shown in FIG. 5. Point 36 in FIG. 5 is the resistance film 28 would have with the magnetic vector in the position 30 shown in FIG. 4. As field 32 rotates the magnetic vector to a point parallel to sense line 26, the resistance is a maximum as shown at point 38 in FIG. 5. The irreversible limit of film 28 is reached at some applied A.C. field value and it switches states. As the magnetic vector passes point 42, it is perpendicular to sense line 26 and the resistance is therefore a minimum. This point is shown as point 40 in FIG. 5. As the vector continues to rotate, the resistance begins to increase again as shown by path 44. The vector would like to continue to position 46 shown in FIG. 4 because it tends to align itself with the direction of the strained easy axis; however, the external field 32 tends to cause it to locate at position 48. With these two forces acting on the vector, it settles at point 50 which corresponds to point 52 in FIG. 5. When the external field 32 is reduced to zero, the magnetic vector moves to position 46 in FIG. 4 which corresponds to position 36 in FIG. 5. Thus, as can be seen in FIG. 5, when the film 28 has a non-zero magnetostriction and a stress is applied to it, the film resistance begins to change and, thus, a rapid change in current, $dI$, is detected when the film switches states. This current change is passed through pulse transformer 16 shown in FIG. 3 and produces a signal on output winding 18. Pulse transformer 16 essentially differentiates the signal in FIG. 5 to produce the signal shown in FIG. 6. This signal can be used to control the rate of deposition of the film materials whereby zero magnetostriction may be obtained. For example, if the wire feed method is used as described in copending application 332,220, filed Dec. 20, 1963, the signal may be used to control the feed of the secondary wire to vary the material composition of the generated element that is produced. The control unit for varying the wire feed is schematically represented by block 13 in FIG. 2.

Figure 7:
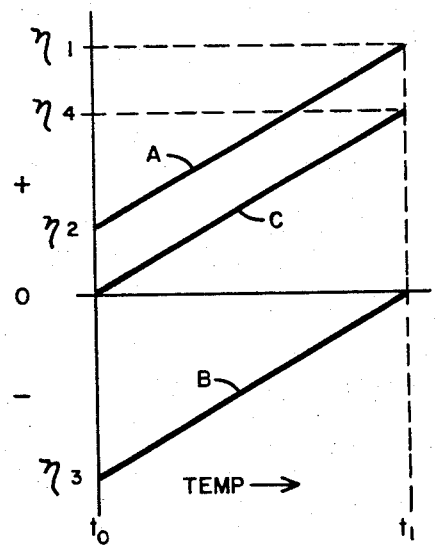
FIG. 7 is a graph illustrating the variation of the magnetostriction of thin films with temperature.

One of the problems involved with depositing zero magnetostriction films is that the magnetostriction of the film varies with the temperature. Thus, as shown by curve A of FIG. 7, if a film is deposited at temperature $T_1$, it will have a value of magnetostriction of $\eta_1$. However, when the film is at room temperature, it will have a magnetostriction of $\eta_2$. Notice curve B where it can be seen that if the film is deposited at temperature $T_1$ to have a value of magnetostriction of zero, this magnetostriction will become a negative $\eta_3$ when the film has cooled to room temperature. Thus, if it is desired that the film have a zero value of magnetostriction at room temperature, it must have a specific value of magnetostriction at $T_1$ as shown by $\eta_4$ in FIG. 7 by curve C.

A method of monitoring the magnetostriction using the magnetostrictive effect while depositing a magnetic film having first and second stable states and a first value of magnetostriction at a first temperature and a second value of magnetostriction at a second temperature is described below. A fixed value of cyclical stress is applied to the film and the magnetization therefore rotates to its new rest position. A D.C. field of such magnitude so as to cause the magnetization to rotate back into alignment with the unstrained easy axis is applied orthogonal to the unstrained easy axis. An A.C. field applied antiparallel to the unstrained axis will cause the magnetization to switch states, and a null will be realized, as explained previously, when the sense line is 45° removed from the unstrained easy axis.

This scheme allows a film to be deposited having a fixed, but a non-zero, value of magnetostriction. The value of the applied D.C. field, $H_{DC}$, is directly proportional to the magnetostriction, the relationship being

(11) $$H_{DC} = \tfrac{1}{2}\eta e$$

where $\eta$ is the magnetoelastic strain coefficient and $e$ is the strain in the film when the stress is applied 45° removed from the easy axis. This can be proven by referring to FIG. 8.

The free energy per unit volume of the film is

(12) $$E = K_1 \sin^2\phi + K_2 \sin^2(\theta - \phi) - MH_{DC}\cos(90+\phi)$$

The torque T per unit volume can be found from Equation 12 using the relationship

(13) $$T = -\frac{dE}{d\phi}$$

Therefore

(14) $$T = -K_1 \sin 2\phi + K_2 \sin 2(\theta-\phi) - MH_{DC}\cos\phi$$

where $K_1 = \tfrac{1}{2} M_s H_k$, and $K_2 = 3/2\lambda_s \tau$; where $M_s$ is the saturation magnetization, $H_k$ is the anisotropy field of the film $\lambda_s$ is the saturation magneostriction constant, and $\tau$ is the applied stress. The magnetization assumes a direction so as to minimize the total free energy, or where the torque is zero. Setting the torque equal to zero in Equation 14, and setting the angle of applied stress at $\theta = 45°$, then

(15) $$K_1 \sin 2\phi - K_2 \cos 2\phi + M_s H_{DC}\cos\phi = 0$$

The value of $H_{DC}$ is increased to rotate the magentization back to its original rest position where $\phi = 0°$. Therefore, solving Equation 15 for $H_{DC}$

(16) $$H_{DC} = K_{2/M_s}$$

(17) $$H_{DC} = \frac{3\lambda_s \tau}{M_s}$$

Using the well known relationships

(18) $$\tau = Ye$$

and

(19) $$\lambda_s = M_s \eta/3Y$$

where Y is Young's modulus of the film material, and where E is the strain in the film, then Equation 17 becomes

(20) $$H_{DC} = \tfrac{1}{2}\eta e$$

Thus, it can be seen from Equation 11 that the applied field, $H_{DC}$ is directly proportional to the magnetostriction and the strain. Therefore, if the strain and the desired magnetostriction are known, the value of $H_{DC}$ required for that particular strain and magnetostriction can be calculated.

Figure 8:
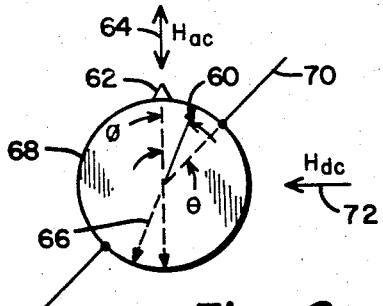
FIG. 8 is a diagram illustrating the effect of a transversely applied D.C. field.

Consider now FIG. 8. Assume that the stress applied to film 68 has caused the magnetic vector to move from its position parallel to easy axis 62 to position 60. Obviously, without the presence of D.C. field 72, A.C. field 64 will cause the film to switch states and vector 60 will move to position 66 when the A.C. field is subsequently removed. Assume, however, that D.C. field 72 is present and is of such a value that it causes vector 60 to move back in line with easy axis 62. The A.C. field 64 will again cause the film to switch states; however, there is no net unidirectional rotation of vector 60 and thus no change in resistance of the film will occur. Thus, a null or no output pulse will be detected. Assume now that the D.C. field 72 is either more or less than that necessary to cause vector 60 to move back in line with easy axis 62. As explained previously, A.C. field 64 will cause the film to switch states and the vector 60 will have a net unidirectional rotation thus causing film 68 to change its resistance. Therefore, an output signal will be produced which can be used to control the deposition process as previously described. The null output will occur only when the film is in a stable state as shown for example in FIG. 8. Therefore, the output produced when the film is in the second of its stable states must be ignored.

The D.C. field 72, $H_{DC}$, is not applied continuously to the film under test, but is applied only when the film is subjected to the maximum applied stress. During this interval, the output produced by the film reversal is sensed. The D.C. field, $H_{DC}$, could be applied anti-parallel to that shown in FIG. 8 and proper operation will be achieved, but the null signal and the large signal described earlier will be reversed. The D.C. field, $H_{DC}$, will, in general, be a pulsed field with a given fundamental repetition frequency that synchronizes with the stressing cycle.

It should be noted that, unlike inductive pickup coil sensing, with the present device the magnetization reversal from each direction of film saturation yields the same polarity output signal. Also, a reversal of the applied stress, which causes a rotation of the magnetization to the opposite side of the unstrained easy axis, produces identical output pulses but with the opposite polarity. The signal with no applied stress, or with a stress applied to a non-magnetostrictive film, is a null output because the film does not switch with unidirectional vector rotation.

Thus, in using the principle of magnetoresistance in a magnetostriction monitoring system, unlike the inductive pickup coil sensing system, no complex alignment problems occur, random noise in the output display is eliminated, and no cumbersome pickup coil is needed. However, a simple, yet efficient, magnetostriction monitoring device is provided.

It is understood that suitable modification may be made in the structure as disclosed provided such modifications come within the spirit and scope of the appended claims. Having now, therefore, fully illustrated and described our invention, what we claim to be new and desire to protect by Letters Patent is:

1. In a method of continuously monitoring the magnetostriction of a magnetic film during deposition wherein a zero magnetostriction film may be deposited at a first temperature, said method including the steps of: depositing a magnetic film on a substrate, said film having two magnetic states and a magnetic vector along an easy axis of magnetization; cyclically applying varying stresses to said element to cause said magnetic vector to rotate away from said easy axis when said film does not have zero magnetostriction; and applying an A.C. drive field to said film parallel to said easy axis to switch the magnetization of said film, the improvement comprising the steps of:

(a) providing first and second electrical conductors to form a completed electrical circuit with said film on said substrate;

(b) coupling said first and second conductors in series with a circuit for passing a current through said film, said series circuit including a source of power and a signal detecting device;

(c) detecting a change in an electrical variable of the completed circuit caused by the cyclical stressing and the applied A.C. field when a non-zero magnetostriction condition exists; and (d) controlling the deposition process with the change in said variable whereby a zero magnetostriction film is deposited at said first temperature.

2. The method of claim 1 including the steps of
(a) applying a D.C. field simultaneously with and transverse to said A.C. field to cause said magnetic vector to tend to re-align itself with said easy axis, and
(b) wherein the step of detecting a change in an electrical variable of the completed circuit occurs only when said film is in a first of said two magnetic states whereby a magnetic film with a second value of magnetostriction at a second temperature is deposited.

3. The method of claim 1 including the step of
(a) electrically coupling said conductors to said film at an angle to said easy axis.

4. The method as defined in claim 3 wherein the step of detecting includes
(a) differentiating the voltage with respect to the resistance of said film to obtain a maximum rate of change of said voltage.

5. The method as defined in claim 4 wherein the step of detecting includes
(a) differentiating the current with respect to the resistance of said film to obtain a maximum rate of change of said current.

6. The method of claim 2 including the step of
(a) electrically coupling said conductors to said film at an angle to said easy axis.

7. The method as defined in claim 6 wherein the step of detecting includes
(a) differentiating the voltage with respect to the resistance of said film to obtain a maximum rate of change of said voltage.

8. The method as defined in claim 7 wherein the step of detecting includes
(a) differentiating the current with respect to the resistance of said film to obtain a maximum rate of change of said current.

References Cited

UNITED STATES PATENTS

| | | | |
|---|---|---|---|
| 3,305,380 | 2/1967 | Adomines | 117—7 |
| 3,336,154 | 8/1967 | Oberg et al. | 117—93.2 |

WILLIAM L. JARVIS, *Primary Examiner.*

U.S. Cl. X.R.

117—93, 93.2, 107; 346—74; 324—71; 118—7